(12) United States Patent
Sheridan

(10) Patent No.: US 11,162,575 B2
(45) Date of Patent: Nov. 2, 2021

(54) GEARED ARCHITECTURE FOR GAS TURBINE ENGINE

(71) Applicant: United Technologies Corporation, Farmington, CT (US)

(72) Inventor: William G. Sheridan, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 9 days.

(21) Appl. No.: 16/689,695

(22) Filed: Nov. 20, 2019

(65) Prior Publication Data

US 2021/0148454 A1 May 20, 2021

(51) Int. Cl.
*F16H 57/08* (2006.01)
*F02C 7/36* (2006.01)
*F16C 33/60* (2006.01)

(52) U.S. Cl.
CPC ............. *F16H 57/082* (2013.01); *F02C 7/36* (2013.01); *F16C 33/605* (2013.01); *F16H 2057/085* (2013.01)

(58) Field of Classification Search
None
See application file for complete search history.

(56) References Cited

U.S. PATENT DOCUMENTS

| | | | |
|---|---|---|---|
| 6,524,206 B2 * | 2/2003 | Tsunemi | B60K 7/0015 475/83 |
| 7,694,505 B2 * | 4/2010 | Schilling | F02K 3/06 60/226.1 |
| 8,511,435 B2 | 8/2013 | Sheridan et al. | |
| 8,585,539 B2 | 11/2013 | Sheridan et al. | |
| 8,905,894 B2 * | 12/2014 | Koyama | F16H 57/082 475/331 |
| 9,303,727 B2 * | 4/2016 | Reimann | F16H 1/28 |
| 9,874,274 B2 | 1/2018 | Sheridan et al. | |
| 9,926,850 B2 | 3/2018 | Sheridan | |
| 10,066,504 B2 * | 9/2018 | Sheridan | F01D 5/02 |
| 10,087,851 B2 | 10/2018 | Sheridan et al. | |
| 10,094,278 B2 * | 10/2018 | Sheridan | F02K 3/06 |
| 10,151,249 B2 | 12/2018 | Venter et al. | |
| 10,167,929 B2 * | 1/2019 | Okumura | F16H 1/28 |

(Continued)

FOREIGN PATENT DOCUMENTS

| | | |
|---|---|---|
| EP | 3144486 | 3/2017 |
| WO | 2014047040 | 3/2014 |

OTHER PUBLICATIONS

The Extended European Search Report for European Patent Application No. 20209057.7 dated Mar. 25, 2021.

*Primary Examiner* — Dirk Wright
(74) *Attorney, Agent, or Firm* — Carlson, Gaskey & Olds, P.C.

(57) ABSTRACT

A turbofan engine includes a fan section. A turbine section is in driving engagement with the fan section through a star gear system. The star gear system includes a plurality of star gears surrounding a sun gear. A carrier supports the plurality of star gears and includes a first carrier bearing flange. A ring gear surrounds the plurality of star gears and includes a ring gear bearing flange. At least one ring gear carrier bearing engages the carrier bearing flange and the ring gear bearing flange. A speed change mechanism for a gas turbine engine is also disclosed.

16 Claims, 5 Drawing Sheets

(56) References Cited

U.S. PATENT DOCUMENTS

| | | | |
|---|---|---|---|
| 10,202,905 B2 | 2/2019 | Venter | |
| 10,221,770 B2 | 3/2019 | Sheridan | |
| 10,280,843 B2* | 5/2019 | Sheridan | F02C 3/107 |
| 10,294,872 B2 | 5/2019 | Thornton et al. | |
| 10,371,244 B2 | 8/2019 | McCune | |
| 10,393,068 B2 | 8/2019 | Swift et al. | |
| 2006/0059887 A1 | 3/2006 | Klingels et al. | |
| 2016/0222888 A1 | 8/2016 | Sheridan | |
| 2017/0081973 A1 | 3/2017 | Swift et al. | |
| 2018/0010551 A1 | 1/2018 | Sheridan | |
| 2018/0291819 A1 | 10/2018 | Sheridan | |
| 2020/0025101 A1* | 1/2020 | Sheridan | F01D 15/12 |
| 2020/0191062 A1* | 6/2020 | Sheridan | F16H 1/28 |

* cited by examiner

GEARED ARCHITECTURE FOR GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Traditionally, a fan drive turbine has driven the fan directly on a common spool and at a single speed. More recently, a gear reduction has been placed between the fan and the fan drive turbine. This allows the fan to rotate at slower speeds than the fan drive turbine.

SUMMARY

In one exemplary embodiment, a turbofan engine includes a fan section. A turbine section is in driving engagement with the fan section through a star gear system. The star gear system includes a plurality of star gears surrounding a sun gear. A carrier supports the plurality of star gears and includes a first carrier bearing flange. A ring gear surrounds the plurality of star gears and includes a ring gear bearing flange. At least one ring gear carrier bearing engages the carrier bearing flange and the ring gear bearing flange.

In a further embodiment of any of the above, the carrier is fixed from rotation relative to an engine static structure by a rigid support.

In a further embodiment of any of the above, a flexible output shaft is in driving engagement with the output shaft.

In a further embodiment of any of the above, a flexible input shaft is in driving engagement with the sun gear.

In a further embodiment of any of the above, the at least one ring gear carrier bearing includes at least one inner race that engages a radially outer side of the ring gear bearing flange and an outer race that engages a radially inner side of the carrier bearing flange.

In a further embodiment of any of the above, the ring gear includes an axially forward extending portion extending forward of a forward plate of the carrier and a radially inward extending portion having the ring gear bearing flange.

In a further embodiment of any of the above, the ring gear bearing flange extends axially downstream from the radially inward extending portion of the ring gear.

In a further embodiment of any of the above, the carrier includes a second carrier bearing flange on an aft plate of the carrier and at least one carrier sun gear bearing engages the second carrier bearing flange and an axially aft bearing flange on the sun gear.

In a further embodiment of any of the above, the sun gear includes an axially forward bearing flange and at least one ring gear carrier bearing engaging the ring gear bearing flange and the axially forward bearing flange on the sun gear.

In a further embodiment of any of the above, the ring gear includes an axially aft extending bearing flange and the at least one ring gear bearing includes a second ring gear bearing engaging the axially aft extending bearing flange and the aft plate of the carrier.

In a further embodiment of any of the above, the carrier includes a second carrier bearing flange on an aft plate of the carrier and at least one carrier sun gear bearing engages the second carrier bearing flange and an axially aft bearing flange on the sun gear.

In another exemplary embodiment, a speed change mechanism for a gas turbine engine includes a plurality of star gears surrounding a sun gear. A carrier supports the plurality of star gears and including a first carrier bearing flange. A ring gear surrounds the plurality of star gears and including a ring gear bearing flange. At least one ring gear carrier bearing engages the carrier bearing flange and the ring gear bearing flange.

In a further embodiment of any of the above, the at least one ring gear carrier bearing includes at least one inner race that engages a radially outer side of the ring gear bearing flange and an outer race that engages a radially inner side of the carrier bearing flange.

In a further embodiment of any of the above, the ring gear includes an axially forward extending portion extending forward of a forward plate of the carrier and a radially inward extending portion having the ring gear bearing flange.

In a further embodiment of any of the above, the ring gear bearing flange extends axially downstream from the radially inward extending portion of the ring gear.

In a further embodiment of any of the above, the carrier includes a second carrier bearing flange on an aft plate of the carrier and at least one sun gear carrier bearing engages the second carrier bearing flange and an axially aft bearing flange on the sun gear.

In a further embodiment of any of the above, the sun gear includes an axially forward bearing flange and at least one sun gear carrier bearing engaging the ring gear bearing flange and the axially forward bearing flange on the sun gear.

In a further embodiment of any of the above, the axially forward bearing flange on the sun gear is at least partially axially aligned with the first carrier bearing flange.

In a further embodiment of any of the above, the ring gear includes an axially aft extending bearing flange and the at least one ring gear bearing includes a second ring gear bearing engaging the axially aft extending bearing flange and the aft plate of the carrier.

In a further embodiment of any of the above, the carrier includes a second carrier bearing flange on an aft plate of the carrier and at least one sun gear carrier bearing engages the second carrier bearing flange and an axially aft bearing flange on the sun gear.

DETAILED DESCRIPTION

Figure 1:
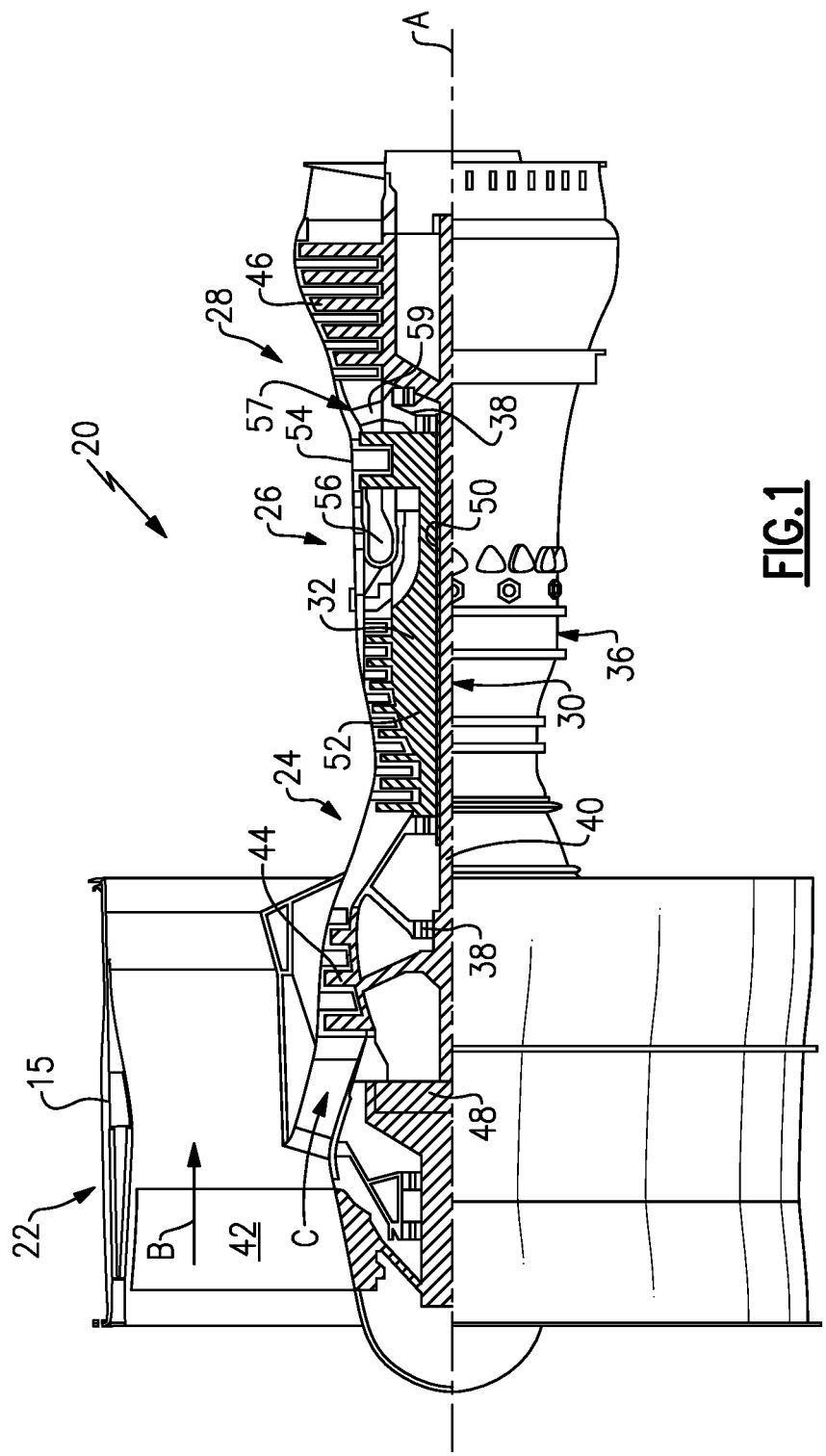
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
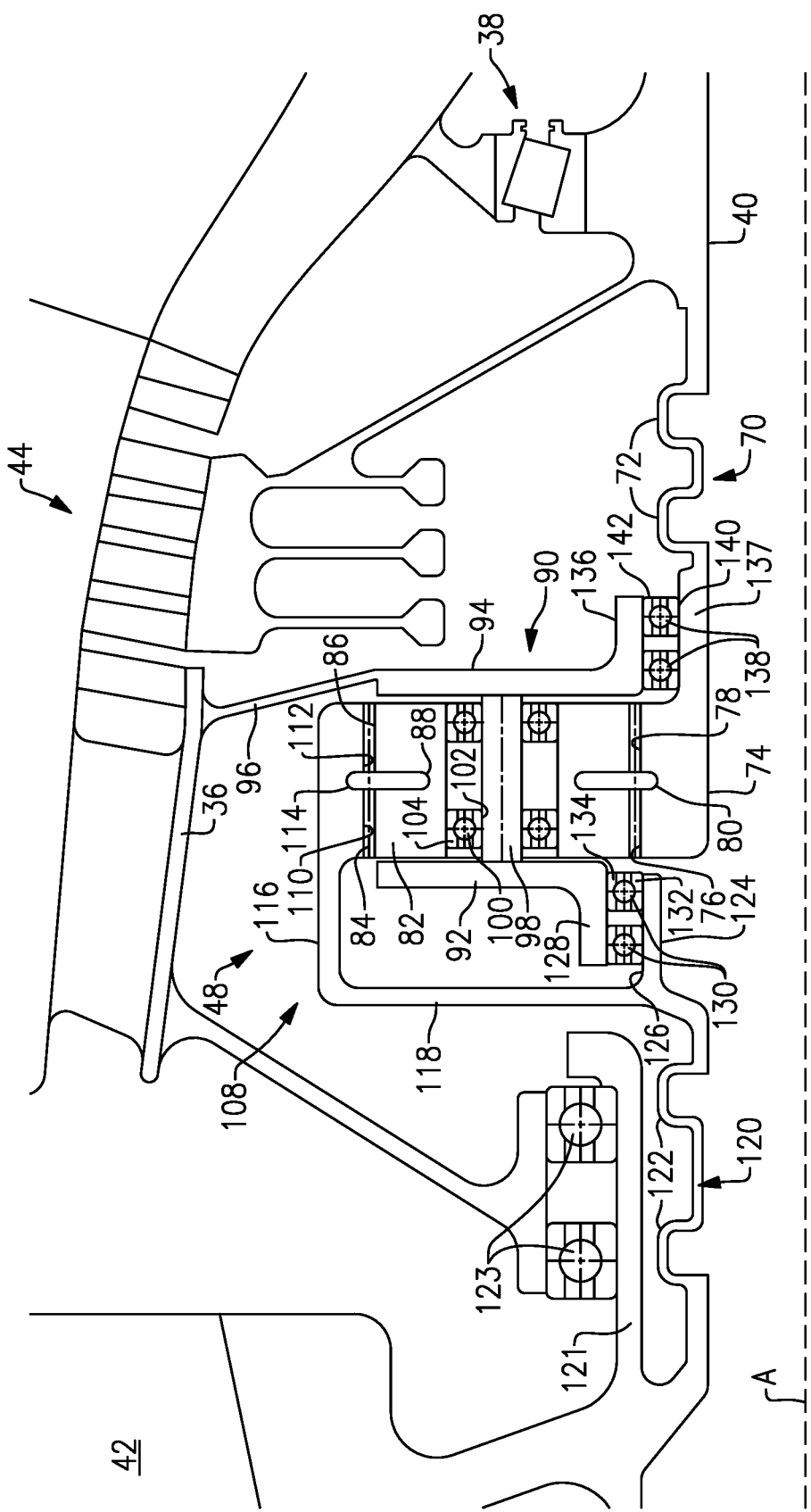
FIG. 2 illustrates a geared architecture according to one example.
Figure 5:
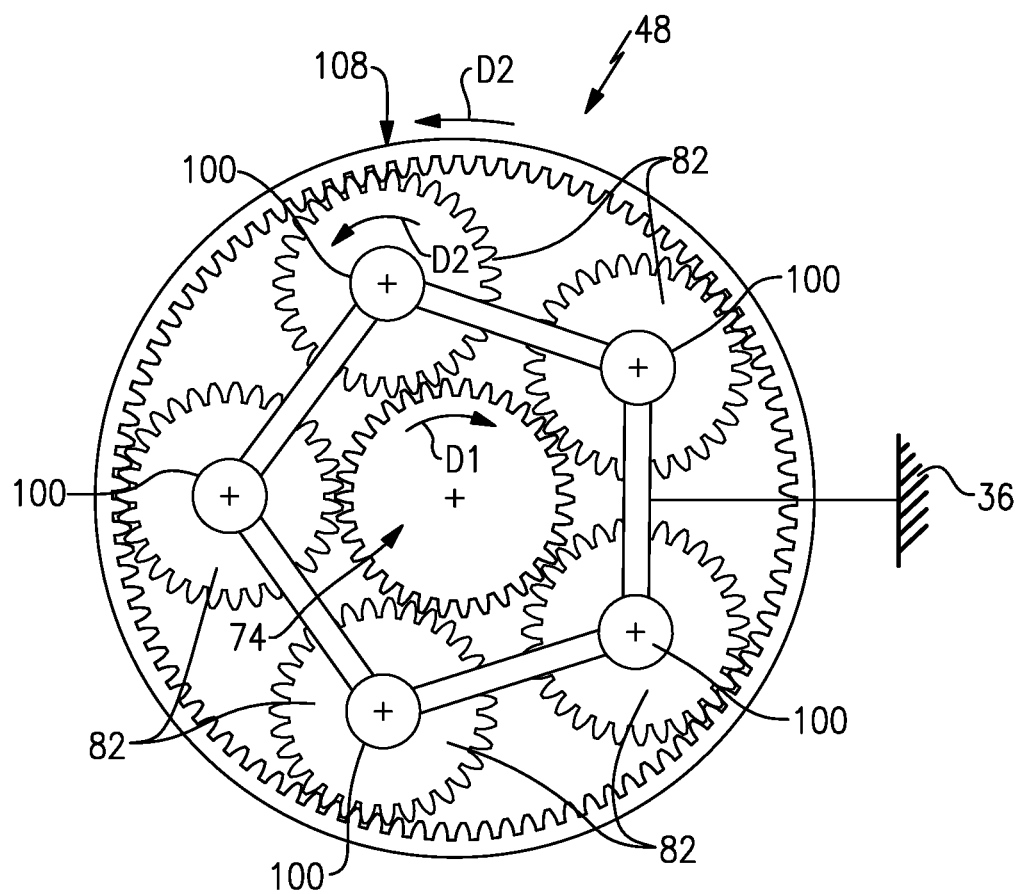
FIG. 5 is a cross-sectional view of the geared architecture of FIG. 2.

FIG. 2 illustrates an enlarged view of the geared architecture 48. In the illustrated example, the inner shaft 40 drives a flexible input shaft 70 having a plurality of undulations 72, which contribute to the flexibility of the input shaft 70. The inner shaft 40 also drives the low pressure compressor 44 at the same rotational speed as the flexible input shaft 70 such that the low pressure compressor 44 rotates at a higher rotational speed than the fan 42. FIG. 5 shows a cross-sectional view of FIG. 2 through geared architecture 48.

The geared architecture 48 can include a sun gear 74, a carrier 90 supporting star gears 82, and a ring gear 108. The sun gear 74 is driven by the flexible input shaft 70. In the illustrated example, the sun gear 74 includes a first set of sun gear teeth 76 located axially forward of a second set of sun gear teeth 78 that are separated by a sun gear trough 80. As shown in FIGS. 2 and 5, multiple star gears 82 are circumferentially spaced around the sun gear 74 and include a first set of star gear teeth 84 located axially forward of a second set of star gear teeth 86 that are separated by a star gear trough 88. The first and second set of sun gear teeth 76, 78 engage a corresponding one of the first and second set of star gear teeth 84, 86, respectively. In this disclosure, axial or axially and radial or radially is in relation to the engine axis A unless stated otherwise. Additionally, upstream and downstream and forward and aft are in relation to a direction of airflow through the engine 20.

The carrier 90 includes a forward plate 92 fixed relative to an aft plate 94. Both the forward and aft plates 92, 94 are fixed from rotating relative to the engine static structure 36 by a carrier support 96 engaging the aft carrier plate 94 and a portion of the engine static structure 36. The carrier support 96 is flexible and includes at least one undulation that contributes to the flexibility of the carrier support 96. In the illustrated example, the forward and aft plates 92, 94 support star gear shafts 98 that are fixed relative to the forward and aft plates 92, 94. Star gear bearings 100 include an inner race 102 that is fixed relative to the star gear shafts 98 and an outer race 104 that is fixed relative to the star gears 82 and rotates with the star gears 82. Although the star gear bearings 100 are shown as ball bearings, other types of bearings such as roller bearings or journal bearings could be used to support the star gears 82.

The ring gear 108 is located radially outward from the star gears 82 and includes a forward set of ring gear teeth 110 located axially forward of an aft set of ring gear teeth 112 that are separated by a ring gear trough 114. The forward and aft sets of ring gear teeth 110, 112 engage the forward and aft set of star gear teeth 84, 86, respectively. The ring gear 108 also includes a forward extending projection 116 that extends axially forward until it reaches a radially extending projection 118 that extends radially inward toward a flexible output shaft 120.

In the illustrated example, the flexible output shaft 120 includes multiple undulations 122 that contribute to the flexibility of the flexible output shaft 120 while still allowing the flexible output shaft 120 to transmit torque and rotational forces. The fan 42 is supported for rotation about the engine axis A by a fan drive shaft 121 with fan shaft bearings 123 engaging the fan drive shaft 121 on a radially inner side and the engine static structure 36 on a radially outer side. In the illustrated example, the flexible output shaft 120 is located radially inward from the fan drive shaft 121 and engages the fan drive shaft 121 axially forward of the fan shaft bearings 123. One feature of this configuration is an increased axial length of the flexible output shaft 120 to allow for greater flexibility and a more axially compact design of the gas turbine engine 20 because the fan drive shaft 121 and the flexible output shaft 120 overlap axially.

In the illustrated example, a ring gear aft extending bearing flange 124 extends axially downstream or aft from the radially extending projection 118. The bearing flange 124 includes a radially outer surface 126 having a generally constant radial dimension. The bearing flange 124 is at least partially axially aligned with a forward extending bearing flange 128 extending axially forward from the forward plate 92 of the carrier 90. A pair of ring gear carrier bearings 130 each include an inner race 132 that rotates with the ring gear 108 and the flexible output shaft 120 and an outer race 134 that is fixed relative to the forward plate 92 of the carrier 90. In the illustrated example, there are two ring gear carrier bearings 130 each engaging one of the bearing flange 124 and the bearing flange 128 and the bearings 130 are ball bearings. However, other types of bearings, such as roller bearings, could be used and more than two ring gear carrier bearings 130 could be used or only one ring gear carrier bearing 130 could be used in the illustrated location.

Similarly, the aft carrier plate 94 includes an aft extending bearing flange 136, the sun gear includes an aft bearing flange 137, and a pair of sun gear carrier bearings 138 engaging both the bearing flanges 136, 137. Each of the sun gear carrier bearings 138 include an inner race 140 fixed to rotate with the sun gear 74 and an outer race 142 fixed relative to the bearing flange 136. In the illustrated example, the sun gear carrier bearings 138 are ball bearings. However, other types of bearings, such as roller bearings, could be used and more than two sun gear carrier bearings 138 could be used or only one sun gear carrier bearing 138 could be used in the illustrated location.

One feature associated with utilizing at least one of the ring gear carrier bearings 130 and at least one of the sun gear carrier bearings 138 is the ability to maintain the sun gear 74, the star gears 82, and the ring gear 108 aligned and concentric. This reduces stress in the components that can result from misalignment. This arrangement further accomplishes the above feature by maintaining the sun gear 74, the star gears 82, and the ring gear 108 in a rigid arrangement through the use of the ring gear carrier bearings 130 and sun gear carrier bearings 138. Additionally, the static nature of the geared architecture 48 is further accomplished with the carrier 92 attached to the engine static structure 36 though the rigid carrier support 96 as opposed to a flexible support that would allow for greater movement of the geared architecture 48. Additionally, the flexible input shaft 70 and the flexible output shaft 120 allow forces from the fan 42 and inner shaft 40 to have little if any influence on alignment of the sun gear 74, star gears 82, and ring gear 108.

Figure 3:
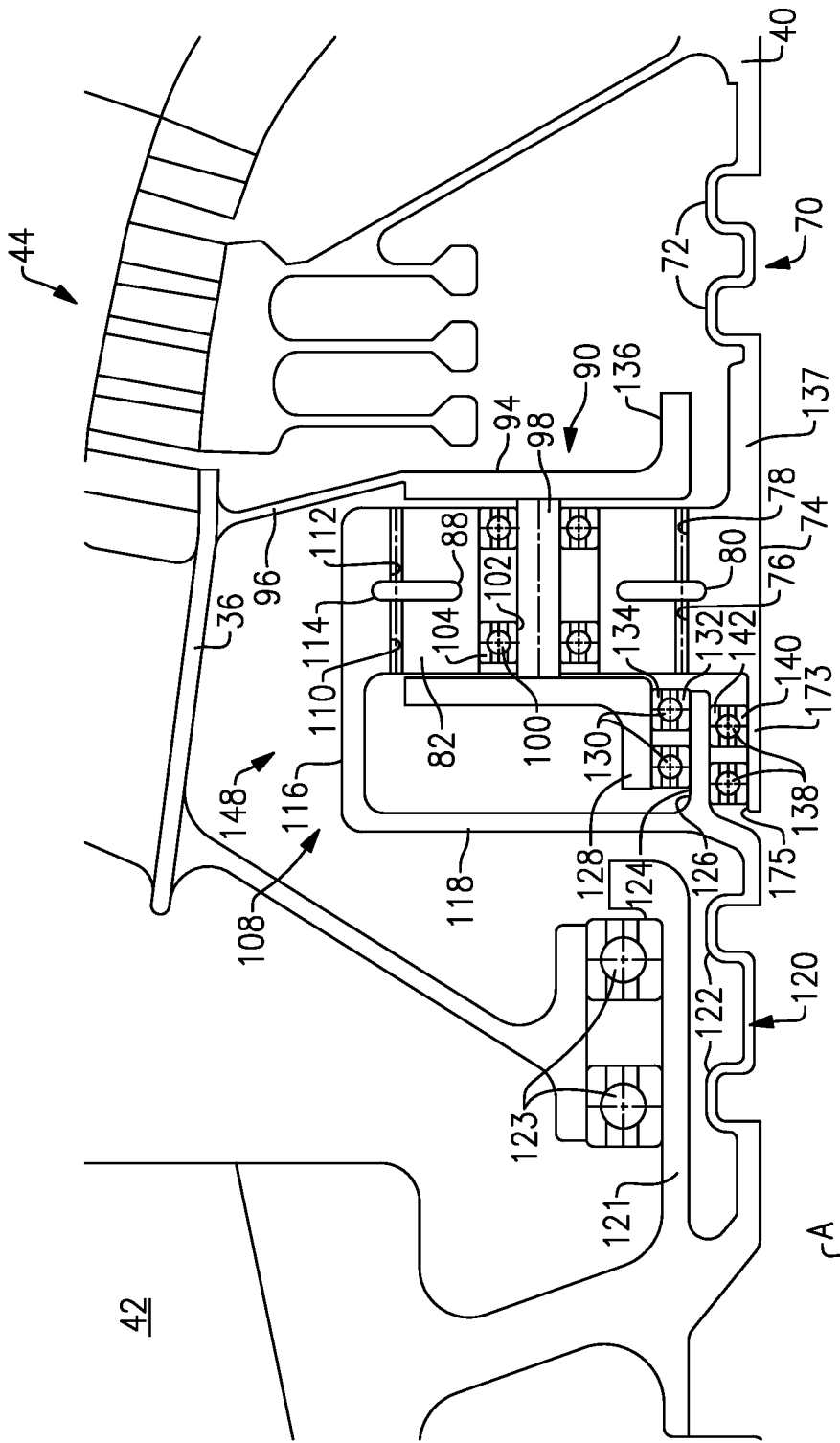
FIG. 3 illustrates a geared architecture according to another example.

FIG. 3 illustrates another example geared architecture 148 similar to the geared architecture 48 except where described below or shown in the Figures. Like numbers will be used between similar or identical components between the geared architecture 48 and the geared architecture 148.

As shown in FIG. 3, the geared architecture 148 includes the sun gear carrier bearings 138 located on an axially forward or upstream side of the geared architecture 148 as opposed to being located on an axially aft or downstream side as shown with the geared architecture 48. When the sun gear carrier bearings 138 are located on the axially forward side of the geared architecture 148, the inner race 140 rotates with the sun gear 74 and engages a sun gear forward bearing flange 173. The forward bearing flange 173 extends from an axially forward side of the sun gear 74 and includes a bearing contact surface 175 on a radially outer side. The outer race 142 on the sun gear carrier bearings 138 engages a radially inner side of the bearing flange 1214 such that the outer race 142 rotates with the output shaft 120.

Figure 4:
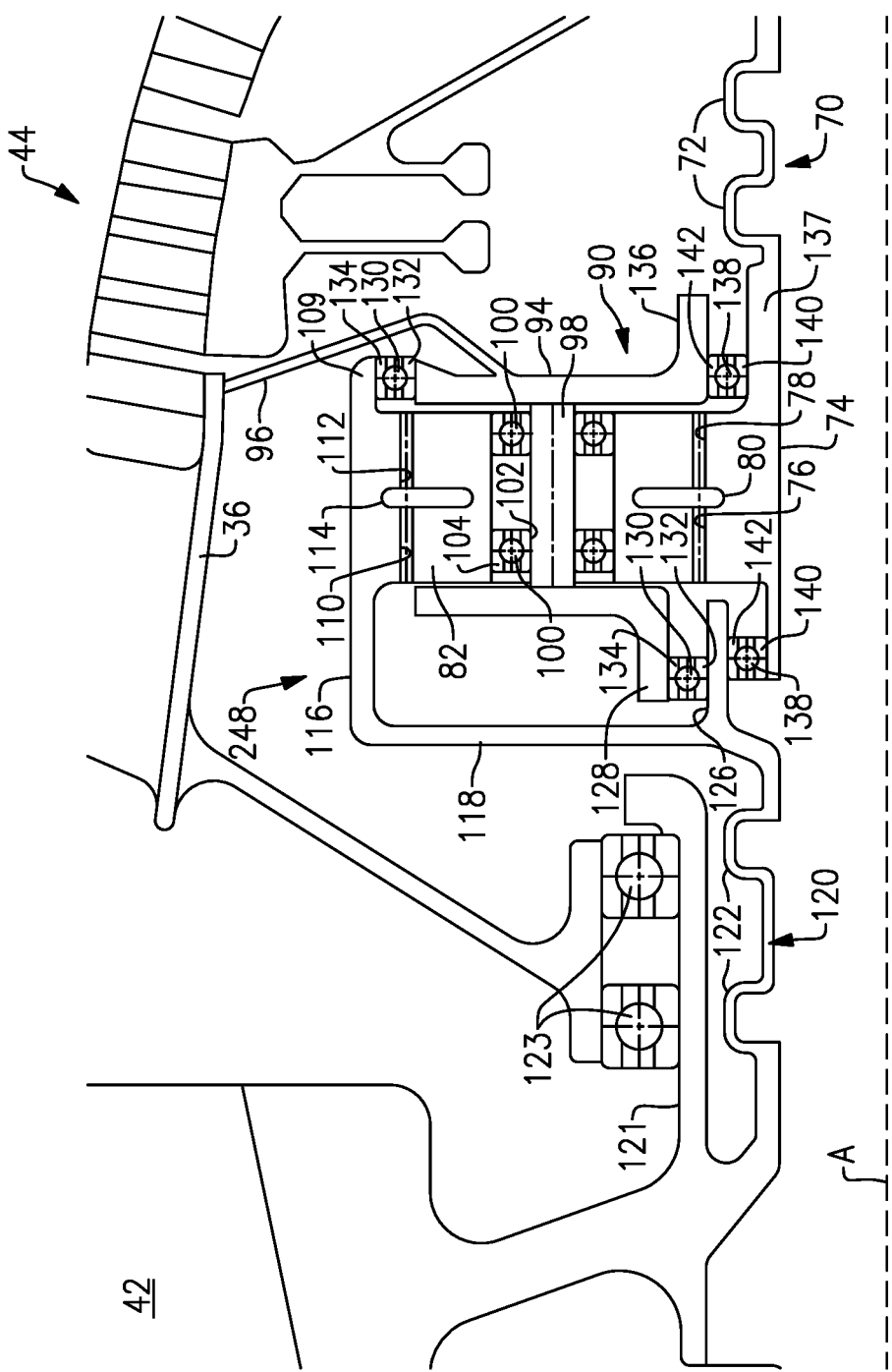
FIG. 4 illustrates a geared architecture according to yet another example.

FIG. 4 illustrates another example geared architecture 248 similar to the geared architectures 48, 148 except where described below or shown in the Figures. Like numbers will be used between similar or identical components between the geared architectures 48, 148 and the geared architecture 248.

As shown in FIG. 4, the geared architecture 248 incudes one of the sun gear carrier bearings 138 located on a forward side similar to the geared architecture 48 and one of the sun gear carrier bearings 138 located on an aft side similar to the geared architecture 48. Additionally, one of the ring gear carrier bearings 130 is also located on the aft side of the geared architecture 248 as well as on a forward side of the geared architecture 248. When at least one of the ring gear carrier bearings 130 is located on a forward side of the geared architecture 248, it is positioned similar to the ring gear carrier bearing 130 shown in the geared architectures 48, 148. However, when one of the ring gear carrier bearings 130 is also located on an axially aft side with the geared architecture 248, the at least one of the ring gear carrier bearings 130 is located between an aft ring gear projection 109 and the aft plate 94 of the carrier 90. The aft ring gear projection 109 extends axially aft from a downstream side of the ring gear 108 and is located radially outward from the first and second sets of ring gear teeth 110, 112. In the illustrated example, the ring gear carrier bearing 130 engages a radially outer edge of the aft carrier plate 94. However, the ring gear carrier bearing 130 could engage another portion of the aft plate 94 on the carrier 90. Additionally, the carrier support 96 engages the aft plate 94 of the carrier 90 radially inward of the ring gear carrier bearing 130 in the illustrated example.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A turbofan engine comprising:
   a fan section; and
   a turbine section in driving engagement with the fan section through a star gear system, the star gear system including:
      a plurality of star gears surrounding a sun gear, the sun gear having an axially aft bearing flange;
      a carrier supporting the plurality of star gears and including a first carrier bearing flange and a second carrier bearing flange on an aft plate of the carrier;
      a ring gear surrounding the plurality of star gears and including a ring gear bearing flange;
      at least one ring gear carrier bearing includes at least one inner race that engages a radially outer side of the ring gear bearing flange and an outer race that engages a radially inner side of the carrier bearing flange; and
      at least one carrier sun gear bearing engages the second carrier bearing flange and an axially aft bearing flange on the sun gear.

2. The turbofan engine of claim 1, wherein the carrier is fixed from rotation relative to an engine static structure by a rigid support.

3. The turbofan engine of claim 2, further comprising a flexible output shaft in driving engagement with a fan drive shaft.

4. The turbofan engine of claim 2, further comprising a flexible input shaft in driving engagement with the sun gear.

5. The turbofan engine of claim 1, wherein the ring gear includes an axially forward extending portion extending forward of a forward plate of the carrier and a radially inward extending portion having the ring gear bearing flange.

6. The turbofan engine of claim 5, wherein the ring gear bearing flange extends axially downstream from the radially inward extending portion of the ring gear.

7. A turbofan engine comprising:
   a fan section; and
   a turbine section in driving engagement with the fan section through a star gear system, the star gear system including:
      a plurality of star gears surrounding a sun gear, the sun gear having an axially forward bearing flange;
      a carrier supporting the plurality of star gears and including a first carrier bearing flange;
      a ring gear surrounding the plurality of star gears and including a ring gear bearing flange; and
      at least one ring gear carrier bearing includes at least one inner race that engages a radially outer side of the ring gear bearing flange and an outer race that engages a radially inner side of the carrier bearing flange;
      wherein at least one ring gear carrier bearing engages the ring gear bearing flange and the axially forward bearing flange on the sun gear.

8. The turbofan engine of claim 7, wherein the ring gear includes an axially aft extending bearing flange and the at least one ring gear bearing includes a second ring gear bearing engaging the axially aft extending bearing flange and the aft plate of the carrier.

9. The turbofan engine of claim 8, wherein the carrier includes a second carrier bearing flange on an aft plate of the carrier and at least one carrier sun gear bearing engages the second carrier bearing flange and an axially aft bearing flange on the sun gear.

10. A speed change mechanism for a gas turbine engine comprising:
    a plurality of star gears surrounding a sun gear, the sun gear having an axially forward bearing flange;
    a carrier supporting the plurality of star gears and including a first carrier bearing flange;
    a ring gear surrounding the plurality of star gears and including a ring gear bearing flange;
    at least one ring gear carrier bearing includes at least one inner race that engages a radially outer side of the ring gear bearing flange and an outer race that engages a radially inner side of the carrier bearing flange; and
    at least one sun gear carrier bearing engaging the ring gear bearing flange and the axially forward bearing flange on the sun gear.

11. The speed change mechanism of claim 10, wherein the ring gear includes an axially forward extending portion extending forward of a forward plate of the carrier and a radially inward extending portion having the ring gear bearing flange.

12. The speed change mechanism of claim 11, wherein the ring gear bearing flange extends axially downstream from the radially inward extending portion of the ring gear.

13. A speed change mechanism comprising:
    a plurality of star gears surrounding a sun gear, the sun gear having an axially aft bearing flange;
    a carrier supporting the plurality of star gears and including a first carrier bearing flange and a second carrier bearing flange on an aft plate of the carrier;
    a ring gear surrounding the plurality of star gears and including a ring gear bearing flange; and
    at least one ring gear carrier bearing includes at least one inner race that engages a radially outer side of the ring gear bearing flange and an outer race that engages a radially inner side of the carrier bearing flange;
    wherein at least one sun gear carrier bearing engages the second carrier bearing flange and an axially aft bearing flange on the sun gear.

14. The speed change mechanism of claim 10, wherein the axially forward bearing flange on the sun gear is at least partially axially aligned with the first carrier bearing flange.

15. The speed change mechanism of claim 10, wherein the ring gear includes an axially aft extending bearing flange and the at least one ring gear bearing includes a second ring gear bearing engaging the axially aft extending bearing flange and the aft plate of the carrier.

16. The speed change mechanism of claim 15, wherein the carrier includes a second carrier bearing flange on an aft plate of the carrier and at least one sun gear carrier bearing engages the second carrier bearing flange and an axially aft bearing flange on the sun gear.

\* \* \* \* \*